United States Patent [19]
Timtner

[11] 3,978,949
[45] Sept. 7, 1976

[54] FRICTIONAL OVERRUNNING CLUTCH

[75] Inventor: Karlheinz Timtner, Bad Homburg vor der Hohe, Germany

[73] Assignee: Ringspann Albrecht Maurer K.G., Bad Homburg vor der Hohe, Germany

[22] Filed: Aug. 1, 1975

[21] Appl. No.: 601,314

[30] Foreign Application Priority Data
Aug. 19, 1974 Germany............................ 2439632

[52] U.S. Cl................................ 192/41 A; 192/45.1
[51] Int. Cl.².......................................... F16D 41/07
[58] Field of Search....................... 192/41 A, 45.1; 188/82.8

[56] References Cited
UNITED STATES PATENTS

| | | |
|---|---|---|
| 3,019,873 | 2/1962 | Ferris et al.......................... 192/45.1 |
| 3,743,066 | 7/1973 | De Lavalette et al........... 192/41 A |
| 3,819,019 | 6/1974 | Timtner............................. 192/41 A |

*Primary Examiner*—Allan D. Herrmann
*Attorney, Agent, or Firm*—Spencer & Kaye

[57] ABSTRACT

A radially wedging, frictional overrunning sprag clutch has an inner ring defining an inner sprag track and an outer ring which is concentric with respect to the inner ring and defines an outer sprag track. The nominal radius of the inner track is corrected by subtracting therefrom the compression of the inner ring, at the location of contact with the sprags, caused by a maximum transmissible torque. The nominal radius of the outer track is corrected by adding thereto the expansion of the outer ring, at the location of contact with the sprags, caused by the maximum transmissible torque.

11 Claims, 2 Drawing Figures

FRICTIONAL OVERRUNNING CLUTCH

BACKGROUND OF THE INVENTION

This invention relates to a radially wedging, frictional overrunning clutch having Z sprags of a profiled section (Z being the number of sprags) which are arranged in a circumferential series between a cylindrical inner track having a diameter $D_i = 2R_i$ and a cylindrical outer track which is arranged concentrically with respect to the inner cylindrical track and which has a diameter $D_a = 2R_a$. The inner cylindrical track is formed by the outer cylinder face of an inner clutch ring whereas the outer track is formed by the inner cylinder face of an outer clutch ring. The sprags are disposed in such a manner that upon rotation of the clutch rings relative to one another in the locking direction, the sprags wedge with their clutch faces against the cylindrical tracks and generate, at the line of contact between sprag and inner track, a radially outwardly directed normal force $N_i$ in the inner ring and further generate at the line of contact between sprag and outer track, a radially inwardly directed normal force $N_a$ in the outer ring. The clutch faces of the sprags have at the line of contact with the inner or, as the case may be, the outer track, a radius of curvature $r_i$ and $r_a$, respectively. The distance between the centers of the two curvatures is designated at $c$. The inner wedging angle $\epsilon_i$ and the outer wedging angle $\epsilon_a$ between the plane containing the two lines of contact and the plane containing one of these lines of contact and the rotary axis of the overrunning clutch are determined by the following equations:

$$\epsilon_i = \frac{1}{1-R_i/R_a} \cdot \arccos \frac{(R_i+r_i)^2 + (R_a-r_a)^2 - c^2}{2 \cdot (R_i+r_i) \cdot (R_a-r_a)} \quad (1)$$

and, respectively, $$\epsilon_a = \frac{R_i}{R_a-R_i} \cdot \arccos \frac{(R_i+r_i)^2 + (R_a-r_a)^2 - c^2}{2 \cdot (R_i+r_i) \cdot (R_a-r_a)}. \quad (2)$$

In this manner, the torques $T_i$ and $T_a$ related to the inner ring and the outer ring, respectively, are obtained as $$T_i = z\, N_i\, R_i \tan \epsilon_i \quad (3)$$

and, respectively, $$T_a = z\, N_a\, R_a \tan \epsilon_a. \quad (4)$$

Taking into consideration Hertz's law, for the normal forces one obtains $$N_i = \frac{2 \cdot \pi \cdot (1-\nu^2)}{E} \cdot \frac{r_i \cdot R_i}{r_i + R_i} \cdot L_i \cdot p_{Hi}^2 \quad (5)$$

and $$N_a = \frac{2 \cdot \pi \cdot (1-\nu^2)}{E} \cdot \frac{r_a \cdot R_a}{R_a - r_a} \cdot L_a \cdot p_{Ha}^2 \quad (6)$$

wherein $\nu$ is Poisson's number,
$E$ is the modulus of elasticity,
$L_i$ and $L_a$ are, respectively, the length of the sprag portion engaging the inner and the outer ring, $p_{Hi}$ and $p_{Ha}$ are, respectively, Hertz's stresses between the inner ring track and the inner clutch face and, respectively, between the outer ring track and the outer clutch face.

Further, it is the smaller value $N$ of the two values $N_i$ and $N_a$ obtained for $p_H = p_{admissible}$ which is to be used as the basis for computing the maximum transmissible torque.

The computation of sprag-type overrunning clutches, be it for the determination of the maximum transmissible torque at given outer dimensions or be it for determining structural dimensions for a given torque, is effected in a conventional manner with the aid of the above-given or related relationships. For a more detailed explanation of these relationships reference is made to FIG. 1 which shows a fragmentary radial section of an overrunning clutch with the more important forces appearing upon torque transmission at the sprag. The outer cylindrical surface of the inner ring 1 constitutes the inner sprag track 2, while the inner cylindrical surface of the outer ring 3 constitutes the outer sprag track 4. Between the inner ring and the outer ring there are positioned the circumferentially arranged sprags 5 which can wedge with their inner clutch face 6 against the inner track 2 and with their outer clutch face 7 against the outer track 4. Upon such an occurrence the forces illustrated in FIG. 1 are generated. In addition to the above-mentioned normal forces $N_i$ and $N_a$ there appear circumferential forces $H_i$ and $H_a$. In order to ensure an equilibrium of force, the resultants of $N_i$ and $H_i$ and, respectively, $N_a$ and $H_a$ have to lie on the same line of action, must be oppositely oriented and must be of identical magnitude, as illustrated in FIG. 1. If one considers that $$H_i = N_i \tan \epsilon_i$$

and, respectively, $$H_a = N_a \tan \epsilon_a,$$

for the transmissible torque there can be obtained immediately the relationships (3) and (4) set forth earlier. It is noted that $\epsilon_i$ and $\epsilon_a$ are structurally predetermined magnitudes which may be constant or may have, in the wedging zone, a minimum value as disclosed in German Laid-Open Application (Offenlegungsschrift) No. 2,204,305 and German Pat. No. 1,199,066. The computation of $\epsilon_i$ and $\epsilon_a$ may be effected trigonometrically with the aid of equations (1) and (2), respectively. Since the wedging angles determine the ratio of the circumferential force to the normal force, one seeks to work, in the engaged (wedging) state, with possibly large wedging angles, that is, it is sought to generate with relatively small normal forces high circumferential forces and thus relatively high torques. The maximum of the wedging angle is determined by the frictional coefficient $\mu_o$ which depends on surface properties. The friction between two bodies, thus the torque transmission, is effected only as long as $$H_i \leq \mu_o N_i \text{ and } H_a \leq \mu_o N_a,$$

or, stated differently, as long as $\tan \epsilon_i \leq \mu_o$ and $\tan \epsilon_a \leq \mu_o$.

Further, it has to be taken into account that during the engaging (coupling) step significantly smaller wedging angle values are necessary because first an oil film, usually coating all components, has to be penetrated before favorable frictional relationships set in which permit a relatively high wedging angle.

Upon the determination of normal forces an upper limit has to be observed as well. This upper limit is determined by the maximum admissible Hertz stress $p_H$ which is in the order magnitude of 400 kp/mm², as long as the hardened ring material has a surface hardness of at least 60 HRc and a hardened depth of at least 0.8 mm and further, the sprags are formed of roller bearing steel hardened through the entire cross section.

A further limit value for the load bearing capacity of the overrunning clutch is the tangential tension $\sigma \phi_a$ in the outer ring track and $\sigma \phi_i$ in the inner ring track. During load, they must not be greater than the admissible tension $\sigma_{adm}$. The permissible tension $\sigma_{adm}$ is obtained, after selection of a suitable safety factor, from the elastic limit $\sigma_s$ of the ring material utilized. The admissible tension is, for the usual materials in overrunning clutches, 60 kp/mm².

With a given Poisson's number $\nu$ which is approximately 0.3 for steel and the modulus of elasticity $E$ which is 21,000 kp/mm² for steel, all magnitudes for determining the maximum permissible normal forces as well as the maximum transmissible torques for a given structure are known.

The outer dimensions, that is, the thickness and width of the inner and outer rings are not parameters in the presently used calculating method. It is known nevertheless that Hertz's stress is not always the load limit but that the load limit may also be caused by stresses in the rings and by elastic deformation of all other components. By virtue of elastic deformations a whole number of important characteristic magnitudes of the overrunning clutch are changed. The most sensitive variable here is the wedging angle. Its magnitude may vary by a factor of 2 in response to deformations. In case the wedging angle increases in an excessive manner with the elastic deformations, the frictional limit is reached with too small loads. As a result, the overrunning clutch will slip before a satisfactory material economy is achieved. On the other hand, for high torque transmissibility it is required that the wedge angle increase with increasing loads because the greater the wedge angle at a given normal force, the greater the circumferential force and thus the transmissible torque. In the work by C. B. Biezeno and R. Grammel, entitled TECHNISCHE DYNAMIK, volume 1, 2nd edition (publisher: Springer, 1953), there is given a method for computing the elastic deformations. This computing method, however, applies only in case of small wall thicknesses. It has been shown in practice, however, that sprag-type overrunning clutches require rings of substantial wall thicknesses. This computing method is therefore not adapted to determine the optimal dimensions of an overrunning clutch for transmitting the highest possible torque for a given available space of installation.

SUMMARY OF THE INVENTION

It is an object of the invention to provide an improved overrunning clutch, the components of which are so dimensioned that a maximum possible transmissible torque is ensured for a given available space of installation. Particularly, the elastic deformations of all components including rings of substantial thickness and the resulting changes of the wedging angle and other dependent magnitudes are taken into account as accurately as possible.

This object and others to become apparent as the specification progresses are accomplished by the invention, according to which, briefly stated, the radius of the inner track is determined by subtracting from the nominal radius of the inner track the extent of compression of the inner ring, at the location of contact with the sprags, caused by a maximum transmissible torque. The radius of the outer track is determined by adding to the nominal radius of the outer track the extent of expansion of the outer ring, at the location of contact with the sprags, caused by a maximum transmissible torque.

DESCRIPTION OF THE INVENTION

Figure 1:
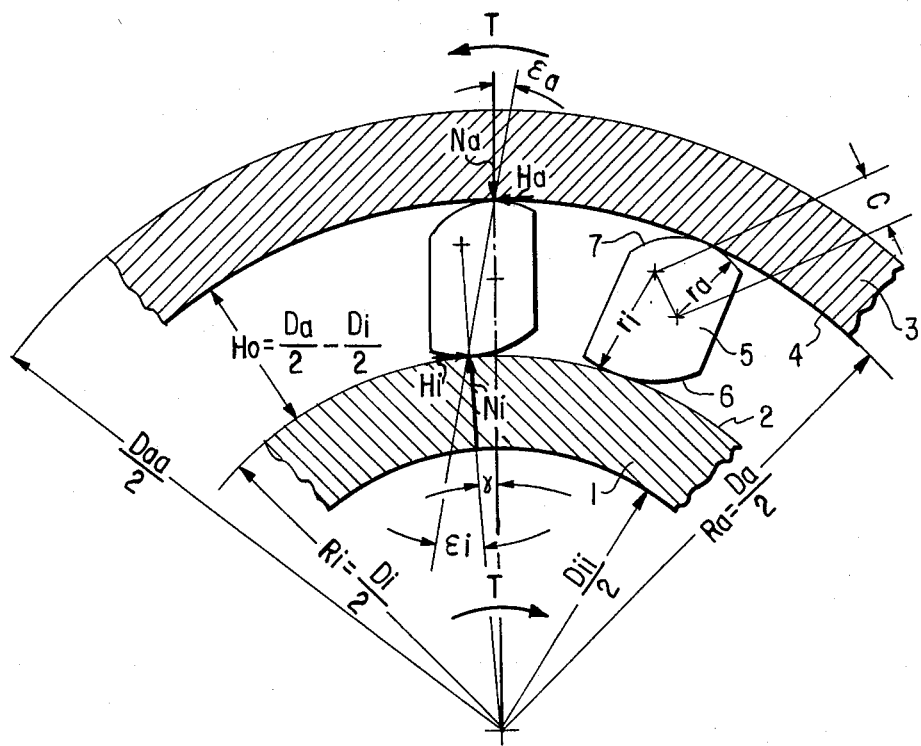
FIG. 1 is a fragmentary schematic cross-sectional view of a radially wedging, frictional overriding clutch showing scalar and vectorial magnitudes.

By varying at least one of the ring thickness ratios $\beta_a$ or $\beta_i$ ($\beta_a = D_{aa}/D_a$ and $\beta_i = D_i/D_{ii}$) in the sense of a maximum transmissible torque, $R_i$ is corrected by subtracting therefrom the extent of compression $\mu_i$ of the inner ring caused by $N$ at the location of engagement between the sprag and the inner ring, and $R_a$ is corrected by adding thereto the extent of expansion $\mu_a$ of the outer ring caused by $N$ at the location of engagement between the sprag and the outer ring. Thus, $$u_i = \frac{z \cdot N}{2 \cdot \pi \cdot E \cdot L_i} \cdot \left\{ -[(1-\nu) + (1+\nu) \cdot \beta_i^2] \cdot \frac{1}{1 - \beta_i^2} + 4 \cdot \sum_{n=1}^{\infty} [-m(1+\nu) \cdot \bar{C}_{im_1} + \right.$$

$$+ m(1+\nu) \cdot \bar{C}_{im_2} - [(m-2) + \nu(m+2)] \cdot \bar{C}_{im_3} +$$

$$\left. + [(m+2) + \nu(m-2)] \cdot \bar{C}_{im_4}] \cdot \frac{J_1(a_{in})}{a_{in}} \right\} \qquad (7)$$

and, $$u_a = \frac{z \cdot N}{2 \cdot \pi \cdot E \cdot L_a} \cdot \left\{ -[(1-\nu) \beta_a^2 + (1+\nu)] \cdot \frac{1}{1 - \beta_a^2} + 4 \cdot \sum_{n=1}^{\infty} [-m(1+\nu) \cdot \bar{C}_{am_1} \cdot \beta_a^{m-2} + \right.$$

$$+ m(1+\nu) \cdot \bar{C}_{am_2} \cdot \beta_a^{-m-2} - [(m-2) + \nu(m+2)] \cdot \bar{C}_{am_3} \beta_a^m +$$

$$\left. + [(m+2) + \nu(m-2)] \cdot \bar{C}_{am_4} \cdot \beta_a^{-m}] \frac{J_1(a_{an})}{a_{an}} \right\} \qquad (8)$$

wherein $m = n \cdot Z$ with summation index $n = 1, 2, 3, 4, 5, \ldots$ ;

$J_1(a_{in})$ = a Bessel function of the first order for a Fourier digit index $n$;

$$a_{in} = \frac{m}{R_i} \sqrt{\frac{8}{\pi} \cdot \frac{1}{E} \cdot \frac{1}{L_i} \cdot \frac{r_i \cdot R_i}{(R_i + r_i)} \cdot N_i} \quad ; \quad (9)$$

$J_1(a_{an})$ = a Bessel function of the first order for a Fourier digit index $n$;

$$a_{an} = \frac{m}{R_a} \sqrt{\frac{8}{\pi} \cdot \frac{1}{E} \cdot \frac{1}{L_a} \cdot \frac{r_a \cdot R_a}{(R_a - r_a)} \cdot N_a} \quad ; \quad (10)$$

$\overline{C}_{imk}$ for $k = 1$ to 4:

| $k$ | $\overline{C}_{imk}$ |
|---|---|
| 1 | $\dfrac{-(m-1) + m\beta_i^2 - \beta_i^{-2m}}{2 \cdot (m-1) \cdot K_i^x}$ |
| 2 | $\dfrac{-(m+1) + m\beta_i^2 + \beta_i^{-2m}}{2 \cdot (m+1) \cdot K_i^x}$ |
| 3 | $\dfrac{-(m+1) + m\beta_i^{-2} + \beta_i^{-2m}}{2 \cdot (m+1) \cdot K_i^x}$ |
| 4 | $\dfrac{-(m-1) + m\beta_i^{-2} - \beta_i^{2m}}{2 \cdot (m-1) \cdot K_i^x}$ |

$K_i^x = 2 \cdot (m^2 - 1) - m^2(\beta_i^2 + \beta_i^{-2}) + (\beta_i^{2m} + \beta_i^{-2m})$ ;

$\overline{C}_{amk}$ for $k = 1$ to 4:

| $k$ | $\overline{C}_{amk}$ |
|---|---|
| 1 | $\dfrac{-(m-1) + m\beta_a^{-2} - \beta_a^{2m}}{2 \cdot (m-1) \cdot K_a^x} \beta_a^{-m+2}$ |
| 2 | $\dfrac{-(m+1) + m\beta_a^{-2} + \beta_a^{-2m}}{2 \cdot (m+1) \cdot K_a^x} \beta_a^{m+2}$ |
| 3 | $\dfrac{-(m+1) + m\beta_a^2 + \beta_a^{-m}}{2 \cdot (m+1) \cdot K_a^x} \beta_a^{-m}$ |
| 4 | $\dfrac{-(m+1) + m\beta_a^2 + \beta_a^{-2m}}{2 \cdot (m+1) \cdot K_a^x} \beta_a^{m}$ |

$K_a^x = 2 \cdot (m^2 - 1) - m^2(\beta_a^2 + \beta_a^{-2}) + (\beta_a^{2m} + \beta_a^{-2m})$ and, wherein the following limit values are not to be exceeded (for which purpose N determined from (5) and (6) is, if necessary, to be reduced and the computation iteratively repeated):

$$\tan \epsilon_i \leq \mu_{adm} \quad (11)$$

and $$\tan \epsilon_a \leq \mu_{adm}, \quad (12)$$

wherein $\epsilon_i$ and $\epsilon_a$ are determined according to equations (1) and (2) and $\mu_{adm}$ is the admissible value of the coefficient of friction;
and, further $$\sigma_{\phi\,i} \leq \sigma_{adm} \quad (13)$$

and $$\sigma_{\phi\,a} \leq \sigma_{adm}, \quad (14)$$

wherein $\sigma_{adm}$ is the admissible tangential stress and $\sigma_{\phi\,i}$ and $\sigma_{\phi\,a}$ are the actual tangential stresses in the inner ring and in the outer ring, respectively and have to satisfy the condition of the equations $$\sigma_{\phi\,i} = \tfrac{1}{2} \cdot \frac{z}{\pi} \cdot \frac{N}{L_i R_i} \cdot \frac{1}{1-\beta_i^2} \cdot 2\beta_i^2 + \sum_{n=1}^{\infty} \frac{4zNJ_1(a_{in})\cos(\eta\pi)}{\pi L_i R_i a_{in} K_i^*} \Big\{ m[-(m-1)+m\beta_i^2-\beta_i^{-2m}] + m[-(m+1)+m\beta_i^2+\beta_i^{2m}]+(m+2)[-(m+1)+m\beta_i^{-2}+\beta_i^{-2m}]+(m-2)[-(m-1)+m\beta_i^{-2}-\beta_i^{2m}] \Big\} \quad (15)$$

and, $$\sigma_{\phi\,a} = -\tfrac{1}{2} \cdot \frac{z}{\pi} \cdot \frac{N}{L_a R_a} \cdot \frac{1}{1-\beta_a^2}(1+\beta_a^2) + \sum_{n=1}^{\infty} \frac{4zNJ_1(a_{an})\cos(\eta\pi)}{\pi L_a R_a a_{an} K_a^*} \Big\{ m[-(m-1)+m\beta_a^{-2}-\beta_a^{2m}] + m[-(m+1)+m\beta_a^{-2}+\beta_a^{-2m}]+(m+2)[-(m+1)+m\beta_a^2+\beta_a^{2m}]+(m-2)[-(m-1)+m\beta_a^2-\beta_a^{-2m}] \Big\} \quad (16)$$

wherein $m = n \cdot z$ with summation index $n = 1, 2, 3, 4, 5$, and $z$ = number of sprags.

In the design of an overrunning clutch according to the invention, the starting point is that for a given environment (available space for installation), an alteration of the ring thickness ratios is the easiest to be effected. An alteration of the sprag dimensions is generally not feasible for economic reasons. The sprags manufactured with the aid of drawing dies from drawn steel should be adapted to be used for a large torque range (from approximately 10 kpm to 1000 kpm which corresponds approximately to a magnitude range for the outer diameter $D_{aa}$ of 50 – 400 mm). The geometric shape of the sprag is therefore calculated in general only once and should be determined to have optimal dimensions.

For a given ratio of ring thickness there is first determined, in a conventional manner, the maximum possible normal force $N_i$ or $N_a$ according to equations (5) or (6) on the basis of the permissible Hertz stress. The smaller of the two $N$ values serves as the basis for further computations. The radial deformation of the inner and outer rings which is caused by such normal forces and which could not be taken into account with the dimensioning methods practiced heretofore, is determined in accordance with equations (7) and (8).

For determining these deformations, first a mathematical expression had to be found for the surface pressure distribution appearing in a discontinuous manner at the circumference of the rings. By developing a Fourier series there could be generated a stress distribution extending in a continuous manner over the circumference of the rings; this stress distribution can be made to approximate with arbitrary accuracy the actual, discontinuous surface pressure distribution by using an arbitrarily large number of summation members. For determining the radial and tangential stresses in the rings, differential equations pertaining to the theory of elasticity have been taken as a basis for the planar stress conditions in polar coordinates. The solution was effected by means of Airy's stress function in which the abovementioned Fourier series was introduced as boundary condition. From the stresses determined in the above manner there were obtained, by means of double integration, the desired deformations according to equations (7) and (8).

The members $$\sum_{n=1}^{\infty} [\cdots]\cdots\}$$

in the equations (7) and (8) and the members $$\sum_{n=1}^{\infty} \cdots\{\cdots\}$$

in the equations (15) and (16) are convergent series which may be expediently solved with numerical methods known by themselves. With regard to such methods reference is made to I. N. Bronstein and K. A. Semendjajew: TASCHENBUCH DER MATHEMATIK (publisher: Harri Deutsch, 1966) as well as to W. I. Smirnow: LEHRGANG DER HOEHEREN MATHEMATIK, Part 2 (publisher: VEB, Berlin, 1964). For the computation of the Bessel functions $J_1(a_{in})$ and $J_1(a_{an})$ there is available a very simple approximation polynomial which will show a deviation of only $4.10^{-8}$ in case six members are used. In this connection, reference is made to M. Abramowitz and A. Stegun: HANDBOOK OF MATHEMATICAL FUNCTIONS (Dover Publications, Inc., 1965).

ring thickness ratio is found when this highest possible torque is higher than the highest possible torque for any other possible ring thickness ratios.

As seen, a closed solution based on the mathematically complex relationships is not possible. This is so because in the computation of the torque transmission the problem is one of the second order. This means that during the stressing (loading) step, the geometrical magnitudes vary significantly and that these variations have to be taken into account for the computation. The computation has to be effected therefore in such a manner that one assumes predetermined forces (corresponding to the maximum permissible Hertz stress according to equations (5) or (6)). In this manner the deformation of the inner and outer rings and thus the alteration of the wedging angle after stress is determined. It now has to be examined whether, by means of these assumed forces, the permissible stresses ($p_{Hadm}$ and $\sigma_{adm}$) and the friction limit ($\mu_{adm}$) are exceeded. If they are, the forces have to be reduced for a new computation. What we thus have here is an iterative process which, due to time considerations, expediently is performed by a digital computer.

As a further development of the invention, it has been found to be particularly advantageous to apply the results obtained regarding the deformation of the rings to the deformation of the sprags as well. Thus, the compression $u_{KKi}$ of the sprag caused by $N$ at its inner clutch face and $u_{KKa}$ at its outer clutch face are determined according to these two equations:

$$u_{KKi} = \frac{2}{\pi} \cdot \frac{1-v^2}{E} \cdot \frac{N}{L_i} \cdot [1.1931 + \ln(\frac{R_i + r_i}{2 \cdot R_i \cdot r_i} \cdot L_i) - \tfrac{1}{2} \cdot \ln(\frac{2}{\pi} \cdot \frac{1-v^2}{E} \cdot \frac{(R_i + r_i)N}{R_i \cdot r_i \cdot L_i})] \quad (17)$$

With the calculated radial deformations $u_i$ and $u_a$ the and, $$u_{KKa} = \frac{2}{\pi} \cdot \frac{1-v^2}{E} \cdot \frac{N}{L_a} \cdot [1.1931 + \ln(\frac{R_a - r_a}{2 \cdot R_a r_a} \cdot L_a) - \tfrac{1}{2} \cdot \ln(\frac{2}{\pi} \cdot \frac{1-v^2}{E} \cdot \frac{(R_a - r_a)N}{R_a \cdot r_a \cdot L_a})] \quad (18)$$

track radii $R_i$ and $R_a$ are corrected and with these corrected values the inner and outer wedging angles are re-computed according to equations (1) and (2). If the new wedge angle values are under the value of the maximum permissible frictional angle (see equations (11) and (12)) and further, if the tangential stresses $\sigma_{\phi i}$ and $\sigma_{\phi a}$ caused by $N$ in the inner and outer ring, respectively, are below the maximum permissible tangential stress(see equations (13) and (14)), then for the selected ratio of ring thickness the maximum permissible value for $N$ and thus the maximum permissible torque has already been found. In most cases, however, one of the limit values given in equations (11) to (14) will be exceeded so that the normal force $N$ determined on the basis of the maximum permissible Hertz stress has to be gradually reduced until the wedging angles and the actual tangential stresses have reached or fallen below the permissible coefficient of friction $\mu_{adm}$ and the permissible tangential stresses $\sigma_{adm}$, respectively. With this reduced value for $N$ the highest possible transmissible torque can be calculated for the selected ring thickness ratio based on equation (3) or (4).

For an optimization it is now only necessary to vary the ring thickness ratio systematically within the framework of structural possibilities. For each newly selected ring thickness ratio ($\beta_i$ and $\beta_a$) there is obtained, according to the abovedescribed computing process, a highest maximum transmissible torque. The optimal The obtained value is subtracted from the radius of curvature $r_i$ and $r_a$ existing in the non-stressed condition. Further, by using these new radii of curvature as well as the track radii corrected according to equations (7) and (8) the conditions set forth under (11) to (14) are to be fulfilled, for which purpose the normal force $N$ serving as a basis according to equations (5) or (6) may have to be reduced and the computation iteratively repeated. In this manner not only the deformations of the sprag tracks, but also those of the sprags are taken into account so that there is ensured a true optimization of the dimensioning of the overrunning clutch with regard to the maximum torque for a given available space of installation.

Further, it may be advantageous if, by selecting the materials having the proper hardness and strength and/or by the variation of the cross-sectional configuration of the sprags and/or by the variation of the dimensions of the sprag and/or the difference between the track diameters, the permissible limit values for $p_H$, $\epsilon$ and $\sigma_\phi$ are reached approximately simultaneously. In this manner, although the computation will be longer, the material and/or the available space for installation will be utilized in an optimal manner.

Figure 2:
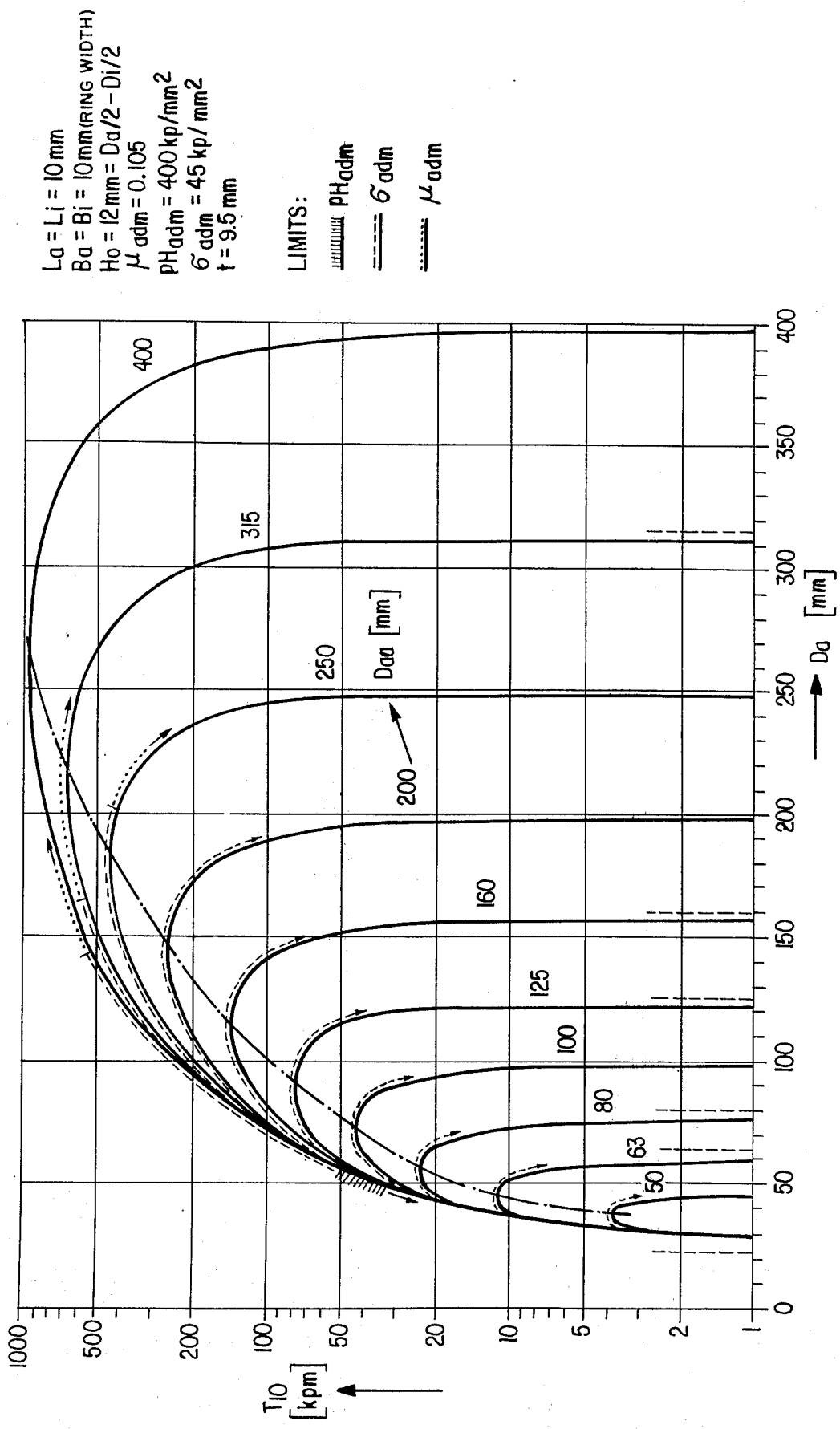
FIG. 2 is a diagrammatic view graphically illustrating the dimensioning of the outer track diameter as a function of the transmissible torque with the outer diameter of the outer ring as parameter.

In FIG. 2 the dimensions of the sprag type overrunning clutch determined according to the invention are graphically represented. There are shown not only the optimal dimensions but also all the ring thickness ratios that are theoretically possible for a given available installation space. In this example, the inner ring was throughout assumed to be a solid shaft. The inner diameter $D_a$ of the outer ring is the abcissa, its outer diameter $D_{aa}$ is shown as a parameter. The maximum transmissible torque $T$ which is to be determined and which, because of the given sprag length of 10 mm, is designated as $T_{10}$, is measured along the ordinate. The computed curves illustrate clearly that for each outer diameter $D_{aa}$ of the outer ring, fixed by a given available installation space, there is given a definite inner diameter $D_a$ of the outer ring for which there exists a positive maximum for the transmissible torque. Even in case of slight deviations from the optimal ring thickness ratio $\beta_a = D_a/D_{aa}$ there results a very substantial decrease of the transmissible torque. Those values of the ring thickness ratio at which the transmissible torque is at its maximum are connected by a dash-dot line in FIG. 2. It is further indicated on the curves which of the three limits, that is, the permissible Hertz stress the permissible tangential stress or the friction limit is determinative for the course of each curve.

It is further within the scope of the invention to vary not only the ring thickness ratio but also, additionally, the sprag cross section, that is, the magnitudes $c$, $r_i$ and $r_a$ and obtain in this manner a maximum torque transmissibility.

Thus, in recapitulation, the dimensioning of the individual components of the overrunning clutch, such as the sectional shape of the sprags and the thickness of the inner and outer clutch rings, as well as the determination of the maximum permissible torque involve the difficulty that the individual components deform elastically during transmission of a torque having any appreciable magnitude. These elastic deformations have an effect on the force distribution and thus affect, for example, the torque transmissibility. The invention makes possible to take into account these elastic deformations in dimensioning the overrunning clutch.

The starting point is a predetermined geometry of the overrunning clutch and the maximum possible normal force is determined based on Hertz's stress. Then the radial deformations of the sprags and the clutch rings caused by this normal force are determined. Subsequently, the original (nominal) values pertaining to a load-free overrunning clutch are corrected by the calculated radial deformations and it is then examined whether — while taking into account these deformations — the tangential stresses and the wedge angle values are below permissible magnitudes. To achieve this, in most cases, the originally obtained normal force has to be reduced until the boundary conditions are met. Based on the reduced normal force value the maximum possible transmissible torque is determined. This torque, however, applies only for the initially selected ring thickness ratio. For an optimization it remains therefore necessary to systematically vary the ring thickness ratio until that ring thickness ratio is found, the highest possible torque of which is greater than the maximum torques of all other possible ring thickness ratios.

It will be understood that the above description of the present invention is susceptible to various modifications, changes and adaptations, and the same are intended to be comprehended within the meaning and range of equivalents of the appended claims.

What is claimed is:

1. In a radially wedging, frictional overrunning clutch having an inner ring and an outer ring arranged concentrically with the inner ring; the inner ring having an outer cylindrical surface constituting an inner track; the outer ring having an inner cylindrical surface constituting an outer track; Z sprags of profiled cross section disposed between the inner and the outer tracks in a circumferential series; each sprag having an inner clutch face cooperating with the inner track and an outer clutch face cooperating with the outer track; each sprag being arranged such that upon rotation between the inner and the outer rings relative to one another in the direction of clutch engagement, the clutch faces of each sprag wedge against the respective track along a line of contact whereby torque is transmitted; the improvement wherein the radius of the inner track is determined by subtracting from the nominal radius of the inner track the extent of compression of the inner ring, at the location of contact with the sprags, caused by a maximum transmissible torque and the radius of the outer track is determined by adding to the nominal radius of the outer track the extent of expansion of the outer ring, at the location of contact with the sprags, caused by the maximum transmissible torque.

2. In a radially wedging, frictional overrunning clutch having an inner ring and an outer ring arranged concentrically with the inner ring; the inner ring having an inner diameter $D_{ii}$ and an outer diameter $D_i=2r_i$; the inner ring further having an outer cylindrical surface constituting an inner track of the diameter $D_i=2R_i$; the outer ring having an outer diameter $D_{aa}$ and an inner diameter $D_a=2R_a$; the outer ring further having an inner cylindrical surface constituting an outer track of the diameter $D_a=2R_a$; the ring thickness ratio for the outer ring being $\beta_a=D_{aa}/D_a$ and the ring thickness ratio for the inner ring being $\beta_i=D_i/D_{ii}$; Z sprags of profiled cross section disposed between the inner and the outer tracks in a circumferential series; each sprag having an inner clutch face cooperating with the inner track and having, at the location of contact, a radius of curvature $r_i$ and an outer clutch face cooperating with the outer track and having at the location of contact, a radius of curvature $r_a$; each sprag being arranged such that upon relative rotation between the inner and the outer rings relative to one another in the direction of clutch engagement, the clutch faces of each sprag wedge against the respective track along a line of contact whereby a radially outwardly oriented normal force $N_i$ is generated in the inner ring at the line of contact, and whereby a radially inwardly oriented normal force $N_a$ is generated in the outer ring at the line of contact; the centers of the two clutch face curvatures being spaced at a distance $c$; and wherein the inner and the outer wedging angle $\epsilon_i$ and $\epsilon_a$, respectively, defined by a plane containing both lines of contact and a plane containing one of the two lines of contact and the rotary axis of the overrunning clutch, is determined by $$\epsilon_i = \frac{1}{1-R_i/R_a} \cdot \arccos \frac{(R_i+r_i)^2 + (R_a-r_a)^2 - c^2}{2 \cdot (R_i+r_i) \cdot (R_a-r_a)} \quad (1)$$

and, respectively, $$\epsilon_a = \frac{R_i}{R_a-R_i} \cdot \arccos \frac{(R_i+r_i)^2 + (R_a-r_a)^2 - c^2}{2 \cdot (R_i+r_i) \cdot (R_a-r_a)}. \quad (2)$$

whereby the torques $T_i$ and $T_a$ transmitted to the inner ring and the outer ring, respectively, is determined by $$T_i = zN_iR_i\tan\epsilon_i \qquad (3)$$

and, $$T_a = zN_aR_a\tan\epsilon_a; \qquad (4)$$

and wherein the normal forces $N_i$ and $N_a$ are, while taking into account Hertz's laws, determined by $$N_i = \frac{2 \cdot \pi \cdot (1 - \nu^2)}{E} \cdot \frac{r_i \cdot R_i}{r_i + R_i} \cdot L_i \cdot p_{Hi}^2 \qquad (5)$$

$$N_a = \frac{2 \cdot \pi \cdot (1 - \nu^2)}{E} \cdot \frac{r_a \cdot R_a}{R_a - r_a} \cdot L_a \cdot p_{Ha}^2 \qquad (6)$$

wherein $\nu$ is Poisson's number, $E$ is the modulus of elasticity, $L_i$ and $L_a$ are those sprag length portions that engage the inner and the outer rings, respectively, $p_{Hi}$ and $p_{Ha}$ are Hertz's stress between the inner track and the inner clutch face and, respectively, between the outer track and the outer clutch face;

and wherein the computation for a maximum transmissible torque is based upon a normal force value $N$ which is the smaller of the values $N_i$ and $N_a$ and which is obtained for $p_H = p_{admissible}$; and further, wherein $R_i$ and $R_a$ are nominal magnitudes of the load-free overrunning clutch; the improvement wherein by varying at least one of the ring thickness ratios $\beta_a$ or $\beta_i$ in the sense of a maximum transmissible torque, with a tolerance of not more than 10%, $R_i$ is corrected by subtracting therefrom the extent of compression $u_i$ of the inner ring caused by $N$ at the location of engagement between the sprag and the inner ring and $R_a$ is corrected by adding thereto the extent of expansion $u_a$ of the outer ring caused by $N$ at the location of engagement between the sprag and the outer ring, and, wherein $$u_i = \frac{z \cdot N}{2 \cdot \pi \cdot E \cdot L_i} \cdot \left\{ -[(1-\nu) + (1+\nu) \cdot \beta_i^2] \cdot \frac{1}{1 - \beta_i^2} + 4 \cdot \sum_{n=1}^{\infty} [-m(1+\nu) \cdot \overline{C}_{im1} + \right.$$
$$+ m(1+\nu) \cdot \overline{C}_{im2} - [(m-2) + \nu(m+2)] \cdot \overline{C}_{im3} +$$
$$\left. + [(m+2) + \nu(m-2)] \cdot \overline{C}_{im4}] \cdot \frac{J_1(a_{in})}{a_{in}} \right\} \qquad (7)$$

and, $$u_a = \frac{z \cdot N}{2 \cdot \pi \cdot E \cdot L_a} \cdot \left\{ -[(1-\nu)\beta_a^2 + (1+\nu)] \cdot \frac{1}{1 - \beta_a^2} + 4 \cdot \sum_{n=1}^{\infty} [-m(1+\nu) \cdot \overline{C}_{am1} \cdot \beta_a^{m-2} + \right.$$
$$+ m(1+\nu) \cdot \overline{C}_{am2} \cdot \beta_a^{m-2} - [(m-2) + \nu(m+2)] \cdot \overline{C}_{am3}\beta_a^m +$$
$$\left. + [(m+2) + \nu(m-2)] \cdot \overline{C}_{am4} \cdot \beta_a^{-m}] \frac{J_1(a_{an})}{a_{an}} \right\} \qquad (8)$$

wherein $m = n \cdot z$ with summation index $n = 1, 2, 3, 4, 5, \ldots$;

$J_1(a_{in})$ = a Bessel function of the first order for a Fourier digit index $n$;

$$a_{in} = \frac{m}{R_i} \sqrt{\frac{8}{\pi} \cdot \frac{1}{E} \cdot \frac{1}{L_i} \cdot \frac{r_i \cdot R_i}{(R_i + r_i)} \cdot N_i} \qquad (9)$$

$J_1(a_{an})$ = a Bessel function of the first order for a Fourier digit index $n$;

$$a_{an} = \frac{m}{R_a} \sqrt{\frac{8}{\pi} \cdot \frac{1}{E} \cdot \frac{1}{L_a} \cdot \frac{r_a \cdot R_a}{(R_a - r_a)} \cdot N_a} \qquad (10)$$

$\overline{C}_{imk}$ for $k = 1$ to 4:

| $k$ | $\overline{C}_{imk}$ |
|---|---|
| 1 | $\dfrac{-(m-1) + m\beta_i^2 - \beta_i^{-2m}}{2 \cdot (m-1) \cdot K_i^r}$ |
| 2 | $\dfrac{-(m+1) + m\beta_i^2 + \beta_i^{2m}}{2 \cdot (m+1) \cdot K_i^r}$ |
| 3 | $\dfrac{-(m+1) + m\beta_i^{-2} + \beta_i^{-2m}}{2 \cdot (m+1) \cdot K_i^r}$ |
| 4 | $\dfrac{-(m-1) + m\beta_i^{-2} - \beta_i^{2m}}{2 \cdot (m-1) \cdot K_i^r}$ |

$K_i^r = 2 \cdot (m^2 - 1) - m^2(\beta_i^2 + \beta_i^{-2}) + (\beta_i^{2m} + \beta_i^{-2m})$;

$\overline{C}_{amk}$ for $k = 1$ to 4:

| $k$ | $\overline{C}_{amk}$ |
|---|---|
| 1 | $\dfrac{-(m-1) + m\beta_a^{-2} - \beta_a^{2m}}{2 \cdot (m-1) \cdot K_a^r} \beta_a^{-m+2}$ |
| 2 | $\dfrac{-(m+1) + m\beta_a^{-2} - \beta_a^{-2m}}{2 \cdot (m+1) \cdot K_a^r} \beta_a^{m+2}$ |
| 3 | $\dfrac{-(m+1) + m\beta_a^2 + \beta_a^{-m}}{2 \cdot (m+1) \cdot K_a^r} \beta_a^{-m}$ |
| 4 | $\dfrac{-(m+1) + m\beta_a^2 + \beta_a^{-2m}}{2 \cdot (m+1) \cdot K_a^r} \beta_a^{m}$ |

$K_a^r = 2 \cdot (m^2 - 1) - m^2(\beta_a^2 + \beta_a^{-2}) + (\beta_a^{2m} + \beta_a^{-2m})$ and wherein the following limit values are not to be exceeded, for which purpose $N$ determined from (5) and (6) is, if necessary, to be reduced and the computation iteratively repeated:

$$\tan\epsilon_i \leq \mu_{adm} \qquad (11)$$

and, $$\tan\epsilon_a \leq \mu_{adm}. \qquad (12)$$

wherein $\epsilon_i$ and $\epsilon_a$ are determined according to equations (1) and (2) and $\mu_{adm}$ is the admissible value of the coefficient of friction; and further $$\sigma_\phi{}^i \leq \sigma_{adm} \qquad (13)$$

and, $$\sigma_{\phi\ a} \leq \sigma_{adm}, \tag{14}$$

wherein $\sigma_{adm}$ is the admissible tangential stress and $\sigma_{\phi\ i}$ and $\sigma_{\phi\ a}$ are the actual tangential stresses in the inner ring and in the outer ring, respectively, and have to satisfy the condition of the equations $$\sigma_{\phi\ i} = \frac{1}{2} \cdot \frac{z}{\pi} \cdot \frac{N}{L_i R_i} \cdot \frac{1}{1-\beta_i^2} \cdot 2\beta_i^2 + \sum_{n=1}^{\infty} \left\{ \frac{4zNJ_1(a_{in})\cos(\eta\pi)}{\pi L_i R_i a_{in} K_i^*} \quad m[-(m-1)+m\beta_i^2-\beta_i^{-2m}] + \right.$$
$$\left. + m[-(m+1)+m\beta_i^2+\beta_i^{2m}]+(m+2)[-(m+1)+m\beta_i^{-2}+\beta_i^{-2m}]+(m-2)[-(m-1)+m\beta_i^{-2}-\beta_i^{2m}] \right\} \tag{15}$$

and $$\sigma_{\phi\ a} = -\frac{1}{2} \frac{z}{\pi} \frac{N}{L_a R_a} \frac{1}{1-\beta_a^2}(1+\beta_a^2) + \sum_{n=1}^{\infty} \frac{4zNJ_1(a_{an})\cos(\eta\pi)}{\pi L_a R_a a_{an} K_a^*} \left\{ m[-(m-1)+m\beta_a^{-2}-\beta_a^{2m}] + \right.$$
$$\left. +m[-(m+1)+m\beta_a^{-2}+\beta_a^{-2m}]+(m+2)[-(m+1)+m\beta_a^2+\beta_a^{2m}]+(m-2)[-(m-1)+m\beta_a^2-\beta_a^{-2m}] \right\} \tag{16}$$

wherein
$m = n \cdot z$ with summation index $n = 1, 2, 3, 4, 5, \ldots$

3. An overrunning clutch as defined in claim 2, wherein a compression $u_{KKi}$ of said sprag at its inner clutch face and a compression $u_{KKa}$ of said sprag at its outer clutch face is determined by $$u_{KKi} = \frac{2}{\pi} \cdot \frac{1-\nu^2}{E} \cdot \frac{N}{L_i} \cdot [1.1931 + \ln(\frac{R_i + r_i}{2 \cdot R_i \cdot r_i} \cdot L_i) - \frac{1}{2} \cdot \ln( \frac{2}{\pi} \cdot \frac{1-\nu^2}{E} \cdot \frac{(R_i+r_i)N}{R_i \cdot r_i \cdot L_i})] \tag{17}$$

and $$u_{KKa} = \frac{2}{\pi} \cdot \frac{1-\nu^2}{E} \cdot \frac{N}{L_a} \cdot [1.1931 + \ln ( \frac{R_a-r_a}{2 \cdot R_a \cdot r_a} \cdot L_a) - \frac{1}{2} \cdot \ln ( \frac{2}{\pi} \cdot \frac{1-\nu^2}{E} \cdot \frac{(R_a-r_a)N}{R_a \cdot r_a \cdot L_a})] \tag{18}$$

and is subtracted from $r_i$ and $r_a$, respectively, to obtain a corrected value therefor; and further, by the utilization of the corrected $r_i$ and $r_a$ values and the corrected $R_i$ and $R_a$ values the conditions (11) – (14) are to be met, wherein, if necessary, $N$ determined from (5) and (6) is to be reduced and the computation iteratively repeated.

4. An overrunning clutch as defined in claim 2, wherein the dimensions $c$, $r_i$ and $r_a$ are also varied in the sense of a maximum torque.

5. An overrunning clutch as defined in claim 2, wherein the admissible limit values for $p_H$, $\epsilon$ and $\sigma_\phi$ are reached approximately simultaneously by selecting a clutch material of proper hardness and strength.

6. An overrunning clutch as defined in claim 2, wherein the admissible limit values for $p_H$, $\epsilon$ and $\sigma_\phi$ are reached approximately simultaneously by varying the sectional shape of the sprags.

7. An overrunning clutch as defined in claim 2, wherein the admissible limit values for $p_H$, $\epsilon$ and $\sigma_\phi$ are reached approximately simultaneously by varying the size of the sprags.

8. An overrunning clutch as defined in claim 2, wherein the admissible limit values for $p_H$, $\epsilon$ and $\sigma_\phi$ are reached approximately simultaneously by varying the difference between the track diameters.

9. An overrunning clutch as defined in claim 2, wherein said tolerance is not more than 6%.

10. An overrunning clutch as defined in claim 2, wherein said tolerance is not more than 3%.

11. An overrunning clutch as defined in claim 2, wherein said tolerance is 0%.

* * * * *